United States Patent Office 3,809,673
Patented May 7, 1974

3,809,673
COMPOSITES AND METHOD FOR MAKING
Dwain M. White, Schenectady, Howard J. Klopfer, Elnora, and Joseph R. McLoughlin, Burnt Hills, N.Y., assignors to General Electric Company
No Drawing. Filed Mar. 20, 1972, Ser. No. 236,191
Int. Cl. C08f 45/28
U.S. Cl. 260—42.16
4 Claims

ABSTRACT OF THE DISCLOSURE

Carbon fiber prepregs convertible to carbon fiber-carbon matrix composites are provided and a method for making them. Carbon fiber tows are treated with acetylenic organic resin and thereafter carbonized to high strength composites.

---

The present invention relates to carbon fiber prepregs which are convertible to carbon fiber-carbon matrix composites.

High strength composites consisting of an organic matrix and a reinforcing fiber, such as glass fiber, boron fiber, carbon fiber, etc., have been viewed with considerable interest by the aircraft industry and other industries interested in the employment of materials convertible to lightweight shaped structures having an unusually high tensile strength and elastic modulus. Various combinations of one or more of the aforementioned fibers and organic resins, such as epoxy resins and polyimides have been evaluated extensively because these materials have provided composites having unusually high strength.

Although a variety of organic resins can be employed to make valuable high strength composites, the resulting composites usually can not be employed effectively at temperatures over 250° C. over extended periods of time, because the organic matrix will decompose and result in premature composite breakdown.

It has now been discovered that carbon fiber prepregs and laminates consisting essentially of carbon fibers, carbon fiber tows treated with certain organic resins having acetylenic unsaturation, defined hereinafter, can be converted to high strength carbon fiber-carbon matrix composites which can be employed at temperatures as high as 1500° C. under substantially non-oxidizing conditions for extended periods of time. Even when employed in an oxidizing atmosphere, such as air, the subject carbon fiber-carbon matrix composites can withstand temperatures greater than 250° C. over extended periods of time.

There is provided by the present invention, curable compositions comprising carbon fibers oriented in a predetermined manner, which have been treated with acetylenic organic resin comprising:

(A) from 10% to 75% by weight of polyacetylene, and
(B) from 25% to 90% by weight of organic plasticizer in the form of a substantially non-volatile aliphatically unsaturated organic compound having at least 90% by weight of chemically combined carbon, a melting point of less than about 125° C., a boiling point of at least 250° C. and a molecular weight in the range of from about 175–500, where (A) consists essentially of, (a) 80 to 100 mole percent of diethynyl arylene units of the formula, (1) $\qquad R(C\equiv C)_2$ (b) 0 to 20 mole percent of diethynyl units of the formula, (2) $\qquad R^1 \left[ \left( O-\underset{\underset{R^3}{|}}{C} \right)_a -C\equiv C- \right]$ where the sum of the mole percent of (a) and (b) is 100, and (B)(c) 0 to 5 percent by weight of diethynyl units of the formula, (3) $\qquad -C\equiv C-$ based on the weight of (a) and (b), where R is a phenylene radical having the valence bond in the meta position, or the para position, where the para phenylene radicals can be present at up to 15 mole percent, based on the total moles of meta and para phenylene radicals in the mixture, where the remaining valences of the phenylene radicals can be substituted with up to four monovalent radicals selected from hydrogen, alkyl radicals, having from 1 to 8 carbon atoms, halogen radicals, and mixtures thereof, $R^1$ is a divalent organo radical selected from hydrocarbon radicals having from 2 to 40 carbon atoms, $$-R^1-, \text{ and } -RXR-$$
$$\underset{Y}{|}$$

Y is selected from $$-OQ \text{ and } -\underset{\underset{}{\overset{O}{\|}}}{C}Q$$

radicals, Q is selected from monovalent hydrocarbon radicals and halogenated monovalent hydrocarbon radicals, X is selected from $$-\underset{\underset{R^3}{|}}{\overset{R^2}{C}}-, -O-, \underset{\underset{O}{\overset{O}{\|}}}{\overset{O}{S}}, \text{ and } \underset{}{\overset{O}{\underset{}{\|}}}{C},$$

$R^2$ is a trivalent aryl radical, $R^3$ is selected from hydrogen and monovalent hydrocarbon radicals, such as methyl or phenyl, and "$a$" has a value of 0 or 1.

Radicals included by R of Formulas 1 and 2 are, for example, arylene radicals, such as phenylene, xylylene, tolylene; halogenated derivatives of such arylene radicals, such as chlorophenylene, chlorotolylene, bromoxylylene, etc. Radicals included by $R^2$ are for example, the aforementioned R radicals, alkylene radicals, such as hexamethylene, heptamethylene, octamethylene, nonamethylene, and radicals such as,

[chemical structures shown]

$-CH_2CH_2OCH_2CH_3-$

Some of the substantially non-volatile aliphatically unsaturated organic compounds which can be employed as organic plasticizer in the practice of the invention are 1,4-diphenylbutadiyne, 1,4-diphenyl-cis-butenyne, 1,4-diphenyl-trans-butenyne, 1,3-bis(phenylbutadiynyl)benzene, etc.

The polyacetylenes which can be employed to make the acetylenic organic resin the practice of the invention are any organic polymer having chemically combined Formula 3 radicals and can consist essentially of chemically combined carbon atoms and hydrogen atoms, or chemically combined carbon atoms, hydrogen atoms, and oxygen atoms, and in particular instances, in addition to the aforementioned atoms, chemically combined sulfur atoms, nitrogen atoms, and mixtures thereof.

Included by the polyacetylenes which can be utilized in the practice of the invention, are polymers containing in addition to Formula 3 radicals, divalent radicals derived from diethynyl aromatic compounds, such as diethynyl benzene. Some of these polyacetylenes are shown by Hay Pat. 3,300,456, and include polymers having chemically combined Formula 1 radicals.

In addition to polyacetylenes having chemically combined Formulas 1 and 2 radicals, are polyesters having acetyleneic bonds in the chain also can be employed as shown by Sladkov et al., Academy of Science, U.S.S.R., Bulletin Chemical Science, 1220–1222 (1963). Some of these polyacetylenes can be made by reacting an acetylenic dicarboxylic acid and a diol such as hexanediol.

Among the preferred polyacetylenes are polyacetylene terpolymers which can be made by reacting ethynylarylene compounds to provide units of Formula 1 such as meta-diethynylbenzene or mixtures of meta-diethynylbenzene with para-diethynylbenzene in combination with compounds which can provide units of Formula 2, such as dipropargyl ethers, diethynyl alkylenes, and optionally with acetylene to provide units of Formula 3, employing the oxidative coupling reaction disclosed in Hay Pat. 3,300,456, assigned to the same assignee as the present invention. There is employed in the oxidative coupling reaction, which will be shown more specifically in the examples set forth later, a basic cupric amine complex, and oxygen. A mixture for example, of a dipropargyl ether of a dihydric phenol can be employed with a diethynyl arylene mixture consisting for example, of meta-diethynylbenzene and para-diethynylbenzene and employed in an oxygenated solution with an oxidative coupling catalyst such as cuprous chloride, N,N,N',N'-tetramethylethylenediamine with an appropriate organic solvent such as dichlorobenzene and pyridine. Recovery of the terpolymer can be achieved by the addition of the reaction mixture to methanol containing a trace of hydrochloric acid. The resulting terpolymer can thereafter be washed by conventional means with a solvent such as methanol and thereafter dried. When employing dipropargyl ether units in the reaction mixture, there is produced "ether terpolymers" while "alkylene terpolymers" can be made by using diethynyl alkylene compounds such as 1,6-diethynylhexane.

Among the ethynylarylene compounds which can be employed to introduce units of Formula 1 into the terpolymer, there can be utilized diacetylene monomers of the arylene and haloarylene series, which can be derived by halogenation then dehydrohalogenation of the corresponding divinyl arylenes, such as divinyl benzene, divinyl toluene, divinyl naphthalene, etc., and the diethylarylenes such as diethylbenzene, diethylnaphthalene, etc.

Included by the dipropargyl ethers which can be employed to introduce units of Formula 2 into the terpolymer are reaction of products of a propargyl halide, such as propargyl bromide, and dihydric phenols of the benzene, naphthalene, anthracene, etc. series, for example, hydroquinone, resorcinol, catechol, the isomeric dihydroxynaphthalenes, the isomeric dihydroxyanthracenes, etc., or they can be dihydroxy substituted biphenyls or diphenyl ethers, e.g., for example, the various isomeric bisphenols, for example, 2,2'-biphenol, 2,3'-biphenol, 2,4'-biphenol, 3,3'-biphenol, 3,4'-biphenol, 4,4'-biphenol, the isomeric bis(hydroxyphenyl) ethers, for example, bis(2-hydroxyphenyl) ether, bis(3-hydroxyphenyl) ether, bis-(4-hydroxyphenyl) ether, 2-(3-hydroxyphenoxy) phenol, 2-(4-hydroxyphenoxy) phenol, 3-(2-hydroxyphenoxy) phenol, 3-(4-hydroxyphenoxy) phenol, etc.

These dihydric phenols can also be the isomeric bis-(hydroxyphenyl) sulfones, or the various isomeric dihydric phenols known as alkylene or alkylidenediphenols for example, 4,4'-isopropylidenediphenol, 2,2'-isopropylidenephenol, 2,4'-isopropylidenediphenol, methylenediphenol, ethylenediphenol, ethylidenediphenol, 4,4'-(isopropylethylene) diphenol, etc.

Any of the above dihydric phenols can be substituted by halogen or a lower alkyl group, i.e., to 1 to 8 carbon atoms, typical examples which are chlorohydroquinone, bromohydroquinone, tetrachlorhydroquinone, methylhydroquinone, ethylhydroquinone, isopropylhydroquinone, butylhydroquinone, pentylhydroquinone, hexylhydroquinone, including cyclohexylhydroquinone, heptylhydroquinone, octylhydroquinone, etc., the corresponding halo and alkyl substituted catechols and resorcinols, etc., the halogen and lower alkyl substituted biphenols, the halogen and lower alkyl substituted bis-(hydroxyphenyl) ethers, the halogen and lower alkyl substituted bis(hydroxyphenyl) sulfones, the halogen and lower alkyl substituted alkylene and alkylidene-biphenols, etc.

In addition to the above dihydric phenols there also can be employed dihydric compounds containing a ketone group such as dihydroxybenzophenones, examples of which are, 2,2'-dihydroxybenzophenone, 2,3'-dihydroxybenzophenone, 2,3-dihydroxybenzophenone, 2,4'-dihydroxybenzophenone, 3,3'-dihydroxybenzophenone, 3,4'-dihydroxybenzophenone, 4,4'-dihydroxybenzophenone, 2,3'-dihydroxybenzophenone, 2,4'-dihydroxybenzophenone, 2,4-dihydroxybenzophenone, 3,4'-dihydroxybenzophenone, the dihydroxybenzils, the dihydroxyphenylnaphthyl ketones, the phenyl dihydroxynaphthyl ketones, the hydroxyphenyl hydroxynaphthyl ketones, etc., are those same aryl ketones containing 1 or more halogens or lower alkyl substituents on the aryl group, examples of which are given above.

Likewise these acetylenic polymers can be dipropargyl ethers of alkylcarbonyl substituted dihydric phenols. The alkylcarbonyl substituted dihydric phenols can be any dihydric phenol, numerous examples of which are given above, which also contains one or more alkylcarbonyl (acyl) substituents. For example, 2,4-dihydroxyacetophenone, 2,3-dihydroxyacetophenone, 2,5-dihydroxyacetophenone, 2,4-dihydroxypropiophenone, acetylbiphenols, diacetylbiphenols, etc.

Units of Formula 2 in the form of diethylalkylene units can be introduced into the terpolymer to produce the alkylene terpolymer by the aforementioned oxidative alkylene coupling procedure of Hay, utilizing diethynyl arylenes as previously defined, in combination with diethynyl alklyenes such as 1,5-hexadiyne, 1,6-heptadiyne, 1,7-octadiyne, etc.

Carbon fiber which can be employed in the practice of the invention includes fiber, derived from carbonized polyacrylonitrile, cellulose acetate, cellulose nitrate, etc. such as Morganite, Type I and II, Thornel 25, 40, 50 etc., fiber made from molten polyvinyl chloride pitch, etc.

Further examples of carbon fiber are shown in Johnson et al. Pat. 3,412,062, and polyacetylene fiber of Sliva et al., Ser. No. 86,295, filed Nov. 2, 1970, and assigned to the same assignee as the present invention. Polyacetylenes useful for making such carbon fiber are further shown by Hay Pats. 3,300,456; 3,332,916 and 3,519,611 assigned to the same assignee as the present invention, and French Pat. 1,557,383. These polyacetylenes are extruded in the form of a blend, and thereafter heated to a temperature up to about 2000° C. to produce a fiber having an elastic modulus of up to about $15 \times 16^6$ p.s.i. The fiber then can be heated to a temperature of up to about 3,300° C., while under a tension of up to about $1 \times 10^5$ p.s.i. to produce a high strength, high modulus fiber useful in making prepregs and composites in accordance with the present invention.

In accordance with the practice of the invention, the carbon fiber is preferably treated with the acetylenic organic resin when the carbon fiber is in the form of a carbon fiber tow or bundle to produce a carbon fiber prepreg. The acetylenic organic resin can be applied to the carbon fiber in the form of a solution or melt. The carbon fiber for example, can be passed through a solution of the acetylenic organ resin when dissolved in an organic solvent, such as chlorobenzene and then heated in a forced air furnace under conditions to effect the evaporation of the organic solvent. Another technique which has been found to be effective is passing the carbon fiber into a melt of the acetylenic organic resin in the form of a mixture consisting of about 80% to 95% by weight of the non-volatile acetylenic unsaturated plasticizer and 5% to 20% of the polyacetylene. Effective results utilizing the melt procedure can be achieved at temperatures in the range of from 100° C. to 140° C.

It has been found that carbon fiber treated in the above described manner retains a uniform coating of the acetylenic organic resin. The coated fibers have a dry smooth surface and can be stored for an indefinite period of time in the dark at 5° C. When they are to be fabricated, they can be cut to the desired length, placed on a mold and heated under pressure. Under the conditions of heat and pressure, the acetylenic plasticizer facilitates the flow of the acetylenic organic resin and the melt flows to fill in void spaces. The prepreg cures to a crosslinked network which can be carbonized with a low weight loss by heating to temperatures up to about 800° C.

Experience has shown the prepreg can consist of a proportion of from about 15% to 60% by weight of the acetylenic organic resin and from 40% to 85% by weight of carbon fiber.

It has also been found that improved modulus and tensile strengths can be obtained in the resulting carbon fiber-carbon matrix composites when the previously defined organic plasticizers are used in combination with maleimides, such as N-phenylmaleimide, N,N'-bismaleimido-4,4'-diphenylmethane, etc. in proportions of up to about 10% by weight of the acetylenic organic resin. Incorporation of the maleimide into the acetylenic resin can be achieved in various ways, including direct addition into fiber coating solutions, dipping acetylenic organic resin treated fiber into organic solvent solutions of maleimide, etc.

In addition optimum properties also are obtained when the carbon fiber is pretreated with nitric acid vapors, to produce improved interfacial adhesion between the carbon fiber and the carbon matrix. Fiber pretreatment can be achieved by hanging the fibers in the vapors of refluxing 60% nitric acids for 5 to 10 hours for high strength Morganite (Type II) fibers, and 2 to 4 days for high modulus (Type I) fibers.

It also has been found that the acetylenic organic resin can be employed in the above described manner to treat various metal filaments, such as tungsten, steel, aluminum, etc., alumina fibers, boron fibers, and silica fibers to produce composites of such fibers in a carbon matrix. Laminated structures utilizing mica also are included within the scope of the present invention, in addition, to the aforedescribed fibers, additional beneficial results also could be achieved by the employment of fillers, such as graphite, powdered Teflon, molybdenum disulfide, silicon carbide, diamond and boron nitride as well as antimony compounds to impart such properties as improved lubricity, abrasive properties and flame retardants. The above described method is also applicable to a continuous process wherein the coating or treatment of the fibers can be incorporated as a final step. The prepregs can be pressed directly into composites of any desired shape. The coated fibers also can be woven into a cloth, which can have a uniformly distributed matrix precursor.

In order that those skilled in the art will be better able to practice the present invention, the following examples are given by way of illustration and not by way of limitation. All parts are by weight.

EXAMPLE 1

A terpolymer was made by employing dipropargyl ether of 2,2-bis(4-hydroxyphenyl) propane, (Bisphenol-A), meta-diethynylbenzene and para-diethynylbenzene utilizing an oxidative coupling catalyst produced with cuprous chloride, N,N,N',N'-tetramethylethylenediamine, and a solvent system of pyridine and dichlorobenzene.

There was added a solution in about 25 parts of dichlorobenzene of 0.5 part of the dipropargyl ether of Bisphenol-A, 4.1 parts of meta-diethynylbenzene, and 0.4 part of para-diethynylbenzene to a mixture of 0.15 part of cuprous chloride, about 0.18 part of N,N,N',N'-tetramethylethylenediamine dissolved in an oxygenated solution of about 1.7 parts of pyridine and 75 parts of ortho-dichlorobenzene at 60° C. The temperature of the mixture rose to 88.5° C. while it was stirred after about 2 minutes. The mixture also became too thick to stir. After 10 minutes the mixture was allowed to cool to room temperature, and added to excess methanol containing a trace of hydrochloric acid. There was obtained a quantitative yield of product having an intrinsic viscosity in ortho-dichlorobenzene at 120° C. of 0.77 dl./g.

The above procedure was repeated except in the mixture employed to make the terpolymer, there was utilized phenylacetylene chain stopper to reduce the molecular weight as follows:

A terpolymer was made by employing dipropargyl ether of 2,2-bis(4-hydroxyphenyl) propane, (bisphenol-A), meta-diethynylbenzene and para-diethynylbenzene with phenylacetylene to control the molecular weight utilizing an oxidative coupling catalyst produced with cuprous chloride, N,N,N',N'-tetramethylethylenediamine, and a solvent system of pyridine and dichlorobenzene.

There was added a solution in about 50 parts of ortho-dichlorobenzene of 2 parts of the dipropargyl ether of bisphenol-A, 16.4 parts of meta-diethynylbenzene, 1.6 parts of para-diethynylbenzene and 2.54 parts of phenylacetylene to a mixture of 0.55 part of cuprous chloride, about 0.7 part of N,N,N',N'-tetramethylethylenediamine dissolved in an oxygenated solution of about 6.8 parts of pyridine and 150 parts of ortho-dichlorobenzene at 60° C. The temperature of the mixture rose to 75° C. while it was stirred after about 8 minutes. After 10 minutes the mixture was allowed to cool to room temperature, and added to excess methanol containing a trace of hydrochloric acid. There was obtained a quantitative yield of low molecular weight terpolymer having an intrinsic viscosity in orthodichlorobenzene at 120° C. of 0.12 dl./g.

Coating solutions were prepared from the above described polyacetylene terpolymers with diphenyl butadiyne in chlorobenzene. The respective coating solutions consisted of 25% by weight of solids. The solids consisted of 50% by weight of the terpolymer and 50% by weight of the dimer. Bundles of carbon fiber were passed through the respective coating solutions at 100° C. which was being agitated and while the fibers were being flexed to provide for effective treatment of the fiber surfaces with the coating solution. The wet fibers were then placed immediately in a forced air oven at 110° C. where they were hung to allow removal of solvent. The cooled fibers were found to have a smooth glossy dry surface after the solvent was fully evaporated.

The coated fibers were then placed in a rectangular mold with a piston having the dimensions of ⅜″ by 2½″. The fibers were then molded by placing the cold mold between preheated platens (300°) in a press. When a temperature of 160° C. was attained in the mold, pressure of about 2000 p.s.i. was applied and maintained for approximately 10 minutes until the mold temperature reached 290° C. The molded bar was removed while the mold was hot.

Additional coating solutions were prepared where the dimer was varied over a proportion of from 50% to 80% by weight of the acetylenic organic resin. In addition various carbon fibers were treated including Morganite I and Morganite II. The following shows the results obtained where the wt. percent terpolymer indicates the weight percent of either high or low molecular weight terpolymer utilized in the acetylenic organic resin employed to treat the fibers, density×(g./cm.), "Flex" (Flexural strength, p.s.i.) and "Mod" (Modulus x 10⁻⁶) indicates properties of the composite.

TABLE I

| Carbon fiber | Wt. percent of acetylenic resin in prepreg | Terpolymer wt. percent in acetylenic resin | Composite properties | | |
|---|---|---|---|---|---|
| | | | Density | Flex | Mod |
| Morganite I | 25 | 50 | 1.52 | 63 | 27.5 |
| Do.ᴸ | 40 | ᵃ 30 | 1.52 | 39.9 | 11.8 |
| Do | 37 | ᵃ 20 | 1.53 | 14.7 | 9.7 |
| Morganite II | 36 | ᵃ 20 | 1.4 | 66 | 9.5 |

ᵃ Higher molecular weight terpolymer, intrinsic viscosity 0.77 was used.

EXAMPLE 2

Coating solutions of the low molecular weight terpolymer of Example 1, 1,4-diphenyl butadiene, and either N-phenylmaleimide, or N,N'-bismaleimido - 4,4'-diphenylmethane dichlorobenzene was prepared for dip coating various tows of Morganite I and II fibers. The coating solutions contained 25.5% of solids of 50% of terpolymer, 40% dimer and 10% of the N-phenymaleimide. The Morganite II fibers had been pretreated in the vapors of refluxing 60% nitric acid for 5 to 10 hours and then washed with water and dried. The Morganite I fibers were treated similarly for 2 to 4 days.

The nitric acid treated fibers were then treated with the above described coating solution by immersing the fibers in the dichlorobenzene coating solution with agitation. The treated fibers were then placed in an air circulating oven at 115° C. for 15 minutes to effect the evaporation of the dichlorobenzene and allow excess resin solution to drip off. The dried tows were cut to 2½ lengths, placed lengthwise in a 2½" by 0.38" mold and pressed while the temperature was rapidly raised from 125° C. to 290° C. over a period of about 20 minutes.

The following table shows the results obtained with various types of carbon fibers utilizing coating mixtures containing various weight percents of either N-phenylmaleimide or bis-maleimde, where surface treatment show hours of nitric acid reflux, N-phenylmalmide wt. percent or bis-maleimide wt. percent shows these respective maleimide wt. percent in the acetylenic organic resin. In Table II, the weight percent of acetylenic organic resin in the various prepregs was essentially the same and approximately 30% by weight.

TABLE II

| Carbon fiber | Surface treatment (hrs.) | Bis-maleimide, percent | N-phenyl maleimide, percent | Composite | |
|---|---|---|---|---|---|
| | | | | Tensile (p.s.i.) | Mod (p.s.i.) |
| Morganite I | 0 | | 0 | 63×10³ | 27.5×10⁶ |
| Do | 0 | 10 | | 58×10³ | 29.5×10⁶ |
| Do | 72 | | 0 | 66×10³ | 26×10⁶ |
| Do | 72 | | 10 | 106×10³ | 28×10⁶ |
| Do | 72 | 10 | | 125×10³ | 28.5×10⁶ |
| Do | ᵃ 72 | 10 | | 130×10³ | 29.4×10⁶ |
| Morganite II | 0 | | 0 | 83×10³ | 15.5×10⁶ |
| Do | 0 | | 20 | 122×10³ | 14.3×10⁶ |
| Do | 5 | | 0 | 149×10³ | 15.6×10⁶ |
| Do | 10 | | 10 | 164×10³ | 14.4×10⁶ |

ᵃ After nitric acid treatment the dried carbon fiber was dipped into a 1% solution of "bis-maleimide."

EXAMPLE 3

A coating solution of the low molecular weight terpolymer of Example 1 (intrinsic viscosity, 0.12 dl./g.) in molten diphenylbutadiyne was prepared. The coating solution consisted of 15% terpolymer and 85% diphenylbutadiyne. Bundles of Morganite I carbon fibers were passed through the coating solution at 125° and then allowed to cool. The coated fibers were molded into rectangular bars by the procedure described in Example 1. The resulting cured composites exhibited superior tensile (p.s.i.) and modulus (p.s.i.).

EXAMPLE 4

Molded bars of Example 2, containing 50 to 75% carbon fiber (from a nitric acid treated Morganite I fiber and with the N-phenylmaleimide additive) were heated to 970° C. under nitrogen to carbonize the resin. The bars lost 3 to 6% of their total weight during the carbonization which corresponded to about a 12% weight loss for the resin portion. The flexural strength and modulus was $48 \times 10^3$ and $19 \times 10^6$ p.s.i. respectively for a bar with 53% carbon fiber.

Although the above examples are limited to only a few of the very many curable compositions which can be made by the method of the present invention, it should be understood that the present invention is directed to a much broader class of acetylenic organic resin comprising polyacetylene having chemically combined units of Formulas 1–3 in combination with various acetylenically unsaturated organic plasticizers as previously defined.

What we claim and desire to secure by Letters Patent of the United States is:

1. Curable compositions comprising carbon fibers oriented in a predetermined manner, which have been treated with acetylenic organic resin comprising:
   (A) from 10% to 75% by weight of a polyacetylene terpolymer consisting essentially of chemically combined metadiethynlylbenzene, units, paradiethynylbenzene units, and Bisphenol-A dipropargyl ether units
   (B) from 25% to 90% by weight of 1,4-diphenyl butadiyne.

2. A curable composition in accordance with claim 1 containing a maleimide selected from the class consisting of N-phenylmaleimide, N,N'-bismaleimido-4,4'-bismaleimido-4,4'-diphenylmethane and mixtures thereof.

3. A curable composition in accordance with claim 1, where (A) is a terpolymer consisting essentially of 12 mole percent of chemically combined diethynyl butane units, 6 mole percent of chemically combined para-diethynyl-benzene units, and 82 mole percent of chemically combined meta-diethynylbenzene units.

4. A curable composition in accordance with claim 1, where the carbon fiber has been pretreated with nitric acid vapors.

References Cited

UNITED STATES PATENTS

| 3,102,047 | 8/1963 | Rivington | 117—46 CC |
| 3,639,197 | 2/1972 | Spain | 161—35 |
| 3,682,595 | 8/1972 | Okuda | 117—46 CC |
| 3,709,863 | 1/1973 | White | 260—32.4 |

MORRIS LIEBMAN, Primary Examiner

P. R. R. MICHL, Assistant Examiner

U.S. Cl. X.R.

117—46 CC, Dig. 11; 260—33.6 UA, 42.17; 264—29; 423—447